(12) United States Patent
LaRocco (10) Patent No.: US 10,821,701 B2
(45) Date of Patent: Nov. 3, 2020

(54) FOAM REEFER WALL USING "LOOP" SCRIM FABRIC BACKING

(71) Applicant: Michael C. LaRocco, Sewickley, PA (US)

(72) Inventor: Michael C. LaRocco, Sewickley, PA (US)

( * ) Notice: Subject to any disclaimer, the term of this patent is extended or adjusted under 35 U.S.C. 154(b) by 546 days.

(21) Appl. No.: 15/475,486

(22) Filed: Mar. 31, 2017

(65) Prior Publication Data

US 2017/0282499 A1 Oct. 5, 2017

Related U.S. Application Data

(60) Provisional application No. 62/316,751, filed on Apr. 1, 2016.

(51) Int. Cl.
| | |
|---|---|
| *B32B 5/02* | (2006.01) |
| *B32B 1/02* | (2006.01) |
| *B32B 7/08* | (2019.01) |
| *B32B 5/20* | (2006.01) |
| *B32B 5/24* | (2006.01) |
| *B65D 90/02* | (2019.01) |
| *B32B 7/12* | (2006.01) |
| *B32B 15/04* | (2006.01) |
| *B32B 3/08* | (2006.01) |
| *B32B 1/08* | (2006.01) |

(52) U.S. Cl.
CPC ............ *B32B 5/024* (2013.01); *B32B 1/02* (2013.01); *B32B 1/08* (2013.01); *B32B 3/08* (2013.01); *B32B 5/02* (2013.01); *B32B 5/022* (2013.01); *B32B 5/028* (2013.01); *B32B 5/20* (2013.01); *B32B 5/245* (2013.01); *B32B 7/08* (2013.01); *B32B 7/12* (2013.01); *B32B 15/046* (2013.01); *B65D 90/022* (2013.01); *B32B 2250/05* (2013.01); *B32B 2260/021* (2013.01); *B32B 2260/046* (2013.01); *B32B 2262/0253* (2013.01); *B32B 2262/0261* (2013.01); *B32B 2262/0276* (2013.01); *B32B 2262/101* (2013.01); *B32B 2266/025* (2013.01); *B32B 2266/0228* (2013.01); *B32B 2266/0235* (2013.01); *B32B 2266/0257* (2013.01); *B32B 2266/0264* (2013.01); *B32B 2307/304* (2013.01); *B32B 2307/50* (2013.01); *B32B 2439/62* (2013.01); *B32B 2605/00* (2013.01); *B32B 2605/08* (2013.01); *B32B 2605/10* (2013.01); *B32B 2607/00* (2013.01)

(58) Field of Classification Search
CPC ........... B32B 5/02; B32B 5/024; B32B 5/026; B32B 5/028; B32B 1/02; B32B 1/08
See application file for complete search history.

(56) References Cited

U.S. PATENT DOCUMENTS 4,761,318 A * 8/1988 Ott ..................... A44B 18/0011
156/244.11

\* cited by examiner

*Primary Examiner* — Walter Aughenbaugh
(74) *Attorney, Agent, or Firm* — Gary P. Topolosky (57) ABSTRACT

An improved fabric backing for the manufacture of glass-reinforced thermoplastic panels that exhibits significantly greater foam adhesion than its scrim counterpart. That fabric backing includes a plurality of looped section extending upwardly (and inwardly) from its base for enhancing adhesion thereto. The combination is subjected to lamination for making an improved glass-reinforced thermoplastic interior wall panel. That wall panel can be used in a storage unit, such as a refrigerated trailer, railcar, shipping container and/or box truck.

7 Claims, 7 Drawing Sheets

FOAM REEFER WALL USING "LOOP" SCRIM FABRIC BACKING

CROSS-REFERENCE TO RELATED APPLICATION

This is a perfection of provisional application Ser. No. 62/316,751, filed on Apr. 1, 2016, the disclosure of which is fully incorporated by reference herein.

BACKGROUND OF THE INVENTION

Since 1998, Applicant has used a polyester point bond fabric backing, or "scrim", on his glass-reinforced thermoplastic panels (GRTP) for the interior walls of refrigerated trailers, railcars, shipping containers, box trucks, and general refrigeration storage/transportation units. The idea for using scrim was originally developed to allow for good bonding during the foaming process whereby insulating foam gets poured, in liquid form, between the cavity of the inner wall (GRTP) and outer wall (metal skin). As that foam catalyzes and solidifies, it soaks into and bonds to the polyester point bond scrim backing thereby allowing the material to stick to the GRTP. Without the scrim, the foam would not bond at all.

The Applicant was granted U.S. Pat. No. 6,743,742 on the original scrim system. Although the idea was novel and relevant at the time, it was later found to be too broad, encompassing "any" panel rather than just panels used for the interiors of refrigerated trailers, truck bodies, container, and rail cars, etc.

Since then, and consequently, the original scrim concept was adopted as a standard practice in the industry and has been used by many competitors in the truck trailer business that also supply both GRTP and thermoset fiberglass panels for refrigerated applications. Various methods to enhance this bond have tried over the years with limited success. One method tried was lofting the scrim (i.e., by using a brush to break surface fibers loose to create better foam bonding thereto). Other methods have been using other materials and/or films to help chemically bond foam to a panel. They do not inherently increase the bonding capability of the panel and are thus no improvement to the standard scrim used since 1998.

The Applicant now believes he has a significant improvement to earlier two-layered, point bond scrim systems. The goal of this invention is to produce a panel product with a unique and varied method of bonding to foam for the reasons set forth herein. The claimed improvement uses a "loop" design polyester which sticks out from the back of the GRTP panel, either with a continuous (or constant) loop height or with a variable loop height. That looped polyester allows for significantly improved mechanical bonding especially when compared to just a "soaking" bond with previous point bond scrim.

Fork trucks and other freight loading mechanisms create tremendous pressure and damage to the inside of a refrigerated unit resulting pressure against the wall as cargo is loaded. In most cases, the pressure causes the connection of point bond scrim to the insulating foam to delaminate due to crushing of the foam just beneath the reinforced panel. The result of that delamination from the foam causes costly downtime with the need to remove walls and reattach elements with adhesives.

Since a unit's typical useful life may exceed fifteen years, the separation of foam from the wall is critical to its longevity. It is true that point bond scrim helps grab the foam and hold it. While methods to try to improve such bonding by scraping or lofting scrim, using intermediates including films, and other methods of foam bonding may have helped, they still have not eliminated the problem. When a wall delaminates from the foam, it allows moisture to infiltrate resulting in loss of insulating efficiency properties. That, in turn, leads to unit damage and the need for costly interior wall repair or replacement.

Other Relevant Art

In chronological order, they include:

Lowthian U.S. Pat. No. 3,934,064 disclosed a composite structure of knitted glass fabric and thermoplastic polyfluoroethylene resin sheet. FIG. 4 therein showed, in an enlargement, a single loop of yarn (from knitted glass fabric) containing a monofilament of a "melt-fabricable perhalopolyfluoroethylene" polymer resin. The composite structure incorporating that fabric was claimed to have corresponding extensibility.

Adams U.S. Pat. No. 4,474,635 disclosed a cushioned panel and a related method of molding it. For the panel, a non-woven fabric with an outer layer of polypropylene or other thermoplastic was heated to the melting point of the fibers before being inserted into a mold with a decorative surface fabric and piece of foam cushioning. The mold was designed so that edges of the male and female mold halves compress for forcing the molten surface of that substrate into interstices of the surface fabric.

Ott et al. U.S. Pat. No. 4,761,318 disclosed a disposable diaper that employed a soft flexible sheet-like fibrous structure with a multiplicity of loops along a first surface, and a layer of thermoplastic resin adhered to a second major surface for anchoring those loops in the fibrous structure. It has no equivalence whatsoever to trailer/container walls.

Novak U.S. Pat. No. 6,863,970 disclosed a product consisting of polyethylene and polypropylene with at least one sheet of fibrous material that enabled bonding of the polyolefin to a non-polyolefin foam. The combination also preferably included a fastener having threaded portions positioned within the foam which threaded portions are not easily removed when an outward force is applied.

Hedley et al Published U.S. Application No. 20100040839 disclosed a method and apparatus for making an embossed thermoplastic liner panel for the interior of a cargo transporter/trailer. The invention inserted a release film between its reinforced polymer feedstock and an impression mat.

Erickson et al. Published U.S. Application No. 20130025766 disclosed a loop fastener material finished by applying foam to a surface of the fabric, that foam containing both a liquid binder and a powder. That binder was allowed to flow into pores of the fabric and coat fiber interstices as the foam collapses. Then, it was dried to stabilize the fabric. The particle size of that powder was selected to cause most of it to remain on the fabric surface while the binder is dried. That fabric surface, with powder bonded thereto, was then activated by heat, RF or UV energy for adhering to yet another surface.

Finally, Lookebill et al. Published U.S. Application No. 20150246511 disclosed a thermal insulated composite wall panel for insulated trailers. The panel included a first liner panel, second liner panel with a layer of fibers and at least one structural polymer resin layer disposed coplanar to and bonded with the fibers layer.

SUMMARY OF THE INVENTION

The products of this invention employ an improved "looped" fabric backing for the manufacture of glass-reinforced thermoplastic panels, said loop fabric backing exhibiting a several fold increase (or a 100%, 150% or as much as a 200% greater foam adhesion) than its point bond scrim counterpart. Another product is the improved glass-reinforced thermoplastic interior wall panel that is made using the aforementioned loop fabric backing. Yet a third improved product is a storage unit, such as a refrigerated trailer, railcar, shipping container and/or box truck having interior wall panels foam adhered to this new and improved loop fabric backing. The latter product would be more damage resistant than its earlier scrim counterparts.

A method for making such improved products starts with (a) providing an improved "loop" fabric backing substrate; (b) providing a single or multiple 0/90, 0/45 tape, or a woven glass reinforced polymer layer (preferably, polypropylene); (c) providing a surface film made of lightweight scrim coated with polypropylene and having a PET-integrated release liner; (d) combining elements (a) through (c) and feeding them into a continuous flatbed laminator or similar lamination line for heating and pressing; then (e) cooling the product exiting the laminator to make a glass-reinforced thermoplastic interior wall panel therefrom.

A further novel method of this invention entails making an improved storage unit, such as a refrigerated trailer, railcar, shipping container and/or box truck with a plurality of the aforementioned glass-reinforced thermoplastic interior wall panels. That unit will exhibit greater adhesion inside of its interior wall panels, resulting in less potential downtime and loss of thermal efficiency from damage from container packers and/or during packaging transport. Due to this increased foam adhesion, such units will have reduced repair/replacement costs and a prolonged useful life.

SUMMARY OF THE DRAWINGS

Further features, objectives and advantages of this invention will become clearer from the following Detailed Description made with reference to the accompanying drawings in which.

DETAILED DESCRIPTION OF PREFERRED EMBODIMENTS

Figure 7:
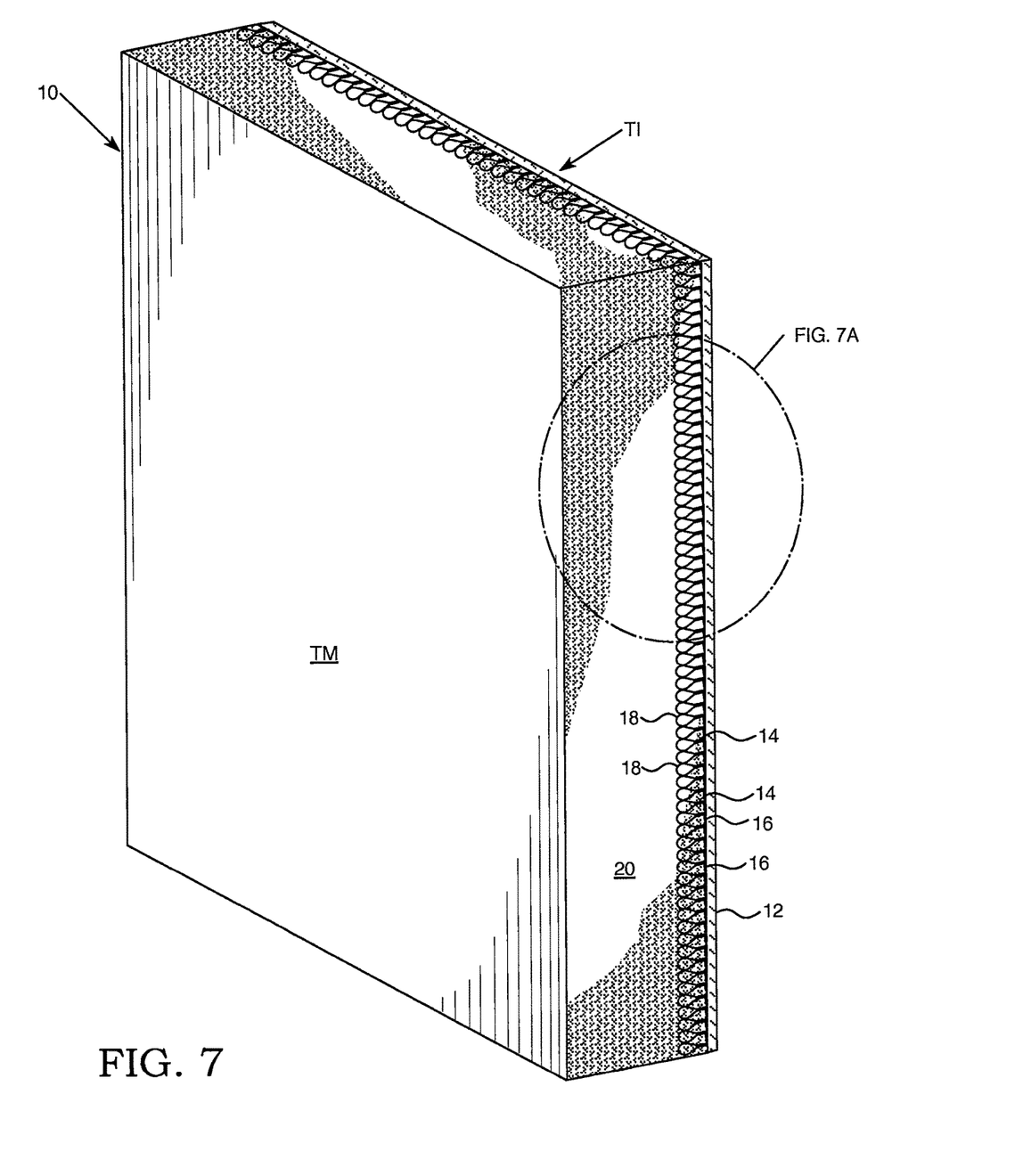
FIG. 7 is a front perspective view showing one system of foam reefer wall according to this invention, said foam reefer wall employing one embodiment of loop scrim fabric backing for improved foam adhesion thereto, all interconnected using one continuous fiber creating base and loop together.
Figure 7A:
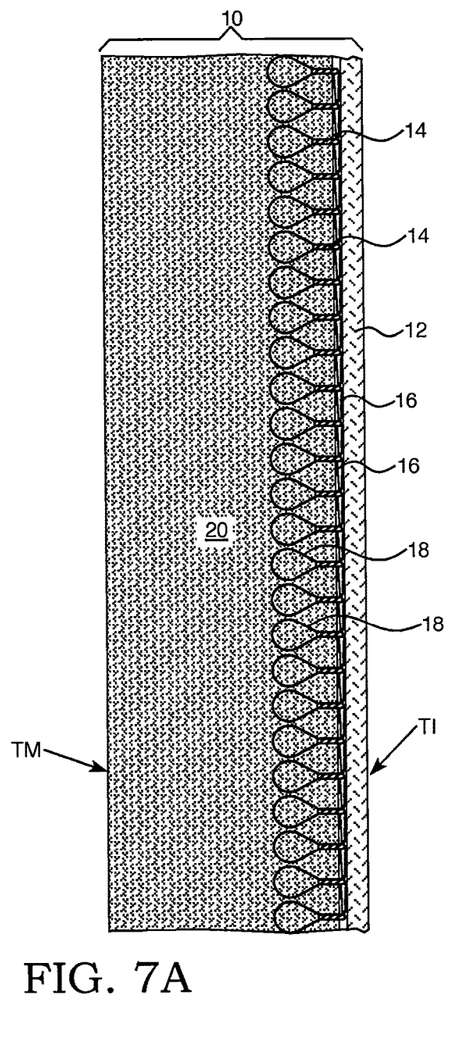
FIG. 7A is a close-up sectional view of the circled area 7A from FIG. 7, showing loops of a substantially uniform or constant height.
Figure 7B:
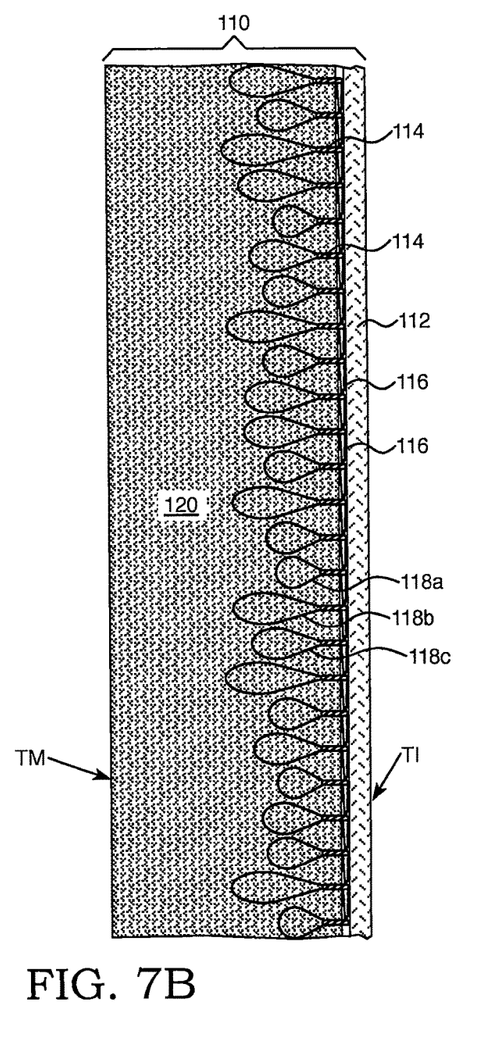
FIG. 7B is a cross-sectional view of a first alternative embodiment showing loops with purposefully variable heights, 118a, 118b and 118c.

When referring to alternate embodiments, like that shown in FIG. 7B, common elements are commonly numbered though in the next hundred series.

When referring to any numerical length, width, percent improvement or other quantitative comparison number (or number range) herein, it should be noted that all such numbers are representative of embodiments of the invention as shown. Furthermore, any such range of numbers should expressly include each and every fraction or decimal between its stated minimum and maximum. For instance, any one component (of loop material) having from about 40 to 70 loops per square inch, should also specifically cover fabric backing substrates having about 41, 42 and 45 loops/in$^2$ . . . and so on, up to about 65, 67 and 69.6 loops/in$^2$. And for loop heights between abut 0.5 to 6 mm or more, preferably about 3 to 5 mm each, those loops would include all values between the aforementioned minimum and maximum loop heights. It is to be understood, however, that Applicant considers the mere aspect of creating such looped scrim fabric backing, regardless of loop size/consistency and/or relative loop density to be a truly novel, game-changer aspect of the present invention.

A fabric backing with at least about 30% greater foam adhesion as compared to its scrim counterpart, would also exhibit about 35, 40 and 50%+ improvement. The same applies for every other quantitative range herein.

Figure 1:
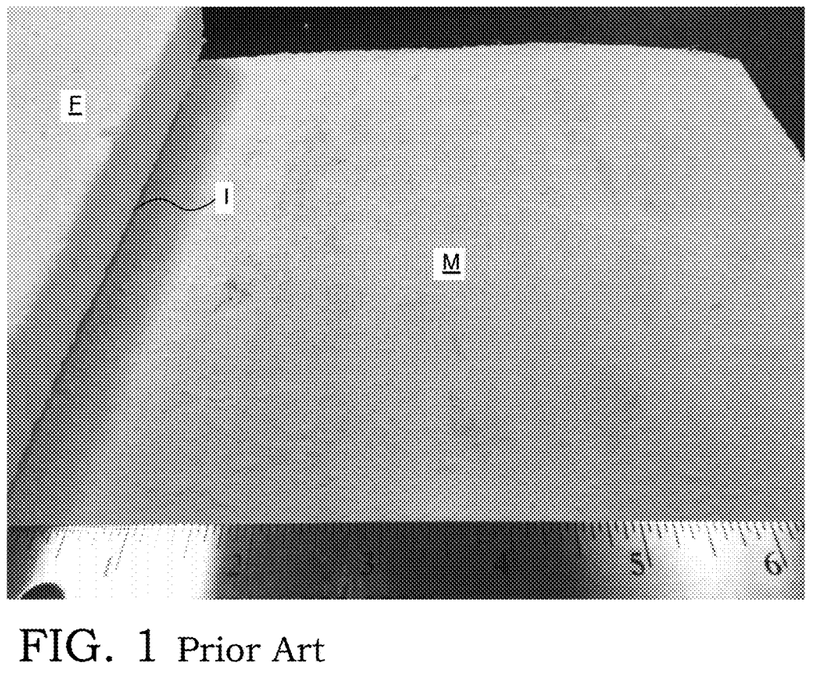
FIG. 1 is a top view photograph showing the prior art adhesion of foam after being pulled from standard scrim backing.

FIG. 1 shows a standard scrim bond as might be made and sold by Xamax Industries, Matterworks and/or OXCO Industries to name a few. Unfortunately, therein, the underlying material M had its foam F separated therefrom with the application of nominal pull pressure due to a weakness of adhesion at the interface I between.

Note the following difficulties/disadvantages with that product:

1) fibers are very small—in only the X- and Y-Axes;

2) there are indentations where the fibers have been connected via a heated "point bond" roller;

3) it is a much denser product—harder to soak into during foaming therefore resulting in worse bonding; and 4) this point bond product is made of two layers bonded together, which could allow separation. It is especially vulnerable to separation especially when moisture is introduced.

Figure 2:
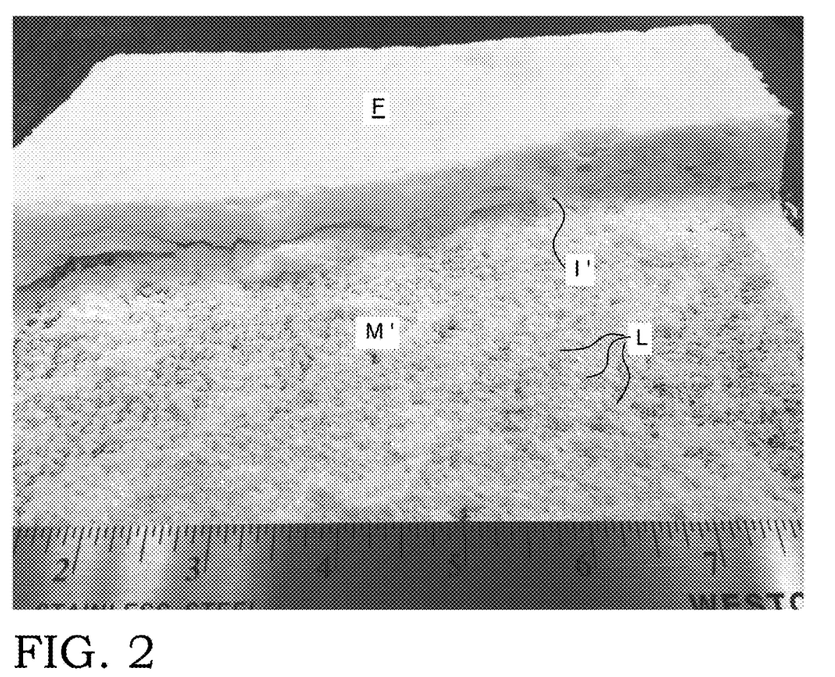
FIG. 2 is a comparative top view photograph showing the foam adhesion to new loop scrim fabric per one embodiment of this invention.

Accompanying FIG. 2 shows Applicant's newest development. It exhibits much advancement and improvement over the current scrim of FIG. 1. The underlying material M' has a plurality of loops L extending upwardly therefrom before being combined with foam F by injection during the manufacture of trailer and other GRTP materials/component parts. The resulting product exhibits much greater adhesion at its interface I'.

Still other advantages of this improved product include:

1) a fiber loop design that has been woven into a pattern extending far beyond the surface of the panel. That allows for the foam to cure around the loops to the bottom connection point and create a much deeper "grab factor". That, in turn, allows for the wall to exceed the surface bond obtained by the current methods of scrim and create a more permanent bond, deep into the cured foam, for solving the delamination issue of prior products.

This is truly a game-changing, MAJOR improvement! When the foam attaches to the wall, the raised "loop" fibers of this invention will grab and hold much better than just an X and Y axis product. The present invention adds a looped dimension to the equation thus making for an overall stronger interior panel. Even if the standard scrim was lofted or roughed up to provide an exposed Z-fiber, as per accompanying FIG. 6, there is still no loop mechanism equivalent that can provide the mechanical grab and reconnection to an interwoven base/bottom that this concept does.

2) The design of the new "loop" has a uniform grid base (loop density can be varied to accommodate different foam compositions and densities) that allows for excellent attachment to applicant's base polypropylene wall and glass mat products so that it holds better.

3) The "loop" design is impervious to moisture unlike old scrim material that can separate when wet into two point bond layers from its point bond.

4) Applicant's polypropylene can soak through this product during the lamination process thereby allowing for a better grab to the trailer interior GRTP wall than the traditional scrim product, a potentially 50%, 75%, even 100% or more adhesion than standard scrim, in fact.

5) Loop fabric can be applied by either laminating on OR gluing to the backside surface of the wall allowing for maximum optional usages in the field.

6) Loop fabric can be of any material such as a polyester, nylon, polypropylene, polyethylene, etc., but should be stiff enough to hold its shape without flattening out as the trailer wall is rolled for shipping or placed into a foaming chamber.

One set of preferred method steps for making this improved material product commences with: (a) providing an improved fabric backing substrate having a plurality of loops interwoven therewith; (b) orienting the plurality of loops in the backing substrate to "stand" in a raised (rather than flattened) condition; and (c) injecting a polymer (preferably, polypropylene) foam about the raised loops for greater impregnation of the polymer into the backing substrate for the manufacture of a trailer scrim/glass-reinforced thermoplastic interior wall panel.

A further novel method entails making an improved storage unit, such as a refrigerated trailer, railcar, shipping container and/or box truck using a plurality of such glass-reinforced thermoplastic interior wall panels. That unit will exhibit greater foam adhesion within said interior wall panels, resulting in less potential damage from container packers and/or during packaging transport. And, due to this increased foam adhesion, such units will have reduced repair/replacement costs and a prolonged useful life.

Applicant believes his improvement fully exploits the revolutionary "loop" fabric that his method employs. That looped design is not the same typical Velcro® underlayment nor even one half of what makes up standard Velcro tape, i.e. the hook OR the partnering loop side. The latter's loops are much smaller and merely intended to coordinate (i.e. mesh) with the hooks of the other material half. It would not be possible, nor practical, to incorporate a full or half portion of typical Velcro® tape for achieving the desired adhesion levels observed with the present invention.

The aforementioned loops may be standard/uniform or continuous in relative height to the interwoven base as per FIG. 7A. Alternately, another embodiment would address improvements using loops of variable heights, such as the short, medium and tall loop heights 118a, 118b and 118c for product 110 in accompanying FIG. 7B.

This invention improves the performance of reinforced and non-reinforced panels used for interiors of refrigerated transportation equipment. Admittedly, surface treatments are used all the time for improving adhesion with glues, etc., but this new dimensional "loop" is truly novel in its unique improvements in this field of use.

Two representative sizes of fully looped materials, made for Applicant by Apex Mills, were manufactured for size comparison purposes. The first was designated RH87 loop material (as seen below):

| STYLE CONTENT: | RH87 | TEST METHOD |
|---|---|---|
| 100% POLYESTER | | ASTM D629 |
| WEIGHT (oz/sq yd): | 5.3 +/− 10% | ASTM D3776 |
| WALES (width)/inch: | 9 +/− 1 | ASTM D3887 |
| COURSES (length)/inch: | 27 +/− 3 | ASTM D3887 |
| INSTRON BALL BURST (lbf): | MIN 75 | ASTM D3787 |
| MULLEN BURST: | N/A | ASTM D3786 |
| THICKNESS (inch): | 0.18 +/− 0.02 | ASTM D1777 |
| TENSILE (LENGTH) | N/A | ASTM D5034 |
| (WIDTH) | N/A | ASTM D5034 |
| | 117 Loops/sq inch +/− 12 Loops | |
| | Loop height: 6 mm +/− 0.6 mm | |
| AT BASE | Loop height: 4 mm +/− 0.4 mm | |

For a smaller, more compact style of fabric backing, a second scale of substrate was made and tested. Called RJ30, its particulars are as follows:

| STYLE CONTENT: | RJ30 | TEST METHOD |
|---|---|---|
| 100% POLYESTER | | ASTM D629 |
| WEIGHT (oz/sq yd): | 4.3 +/− 10% | ASTM D3776 |
| WALES (width)/inch: | 9 +/− 1 | ASTM D3887 |
| COURSES (length)/inch: | 27 +/− 3 | ASTM D3887 |
| INSTRON BALL BURST (lbf): | MIN 75 | ASTM D3787 |
| MULLEN BURST: | N/A | ASTM D3786 |
| THICKNESS (inch): | 0.11 +/− 0.011 | ASTM D1777 |
| TENSILE (LENGTH) | N/A | ASTM D5034 |
| (WIDTH) | N/A | ASTM D5034 |
| | 63 Loops/sq inch +/− 6.5 Loops | |
| | Loop height: 5 mm +/− 0.5 mm | |
| AT BASE | Loop height: 3 mm +/− 0.3 mm | |

RH87 and RJ30 are both warp knitted fabrics utilizing a unique construction where 2 multifilament yarn systems form the substrate and a 3$^{rd}$ heavy gauge monofilament yarn system is anchored on 1 needle and cast off on the alternate needle to form a loop on one side of the fabric while leaving the alternate side of the fabric smooth. Both RJ30 and RH87 are made with 100% Polyester but other yarn types can be substituted therefor.

Figure 3:
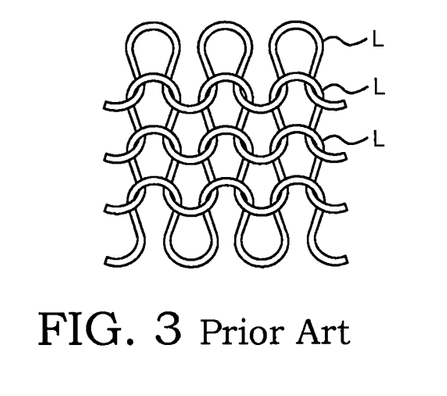
FIG. 3 is a diagrammatic representation of one prior art variety of multiple thread/strand fabric inter-looped to one another but with no base connection, per FIG. 3a of U.S. Pat. No. 3,934,064.
Figure 4:
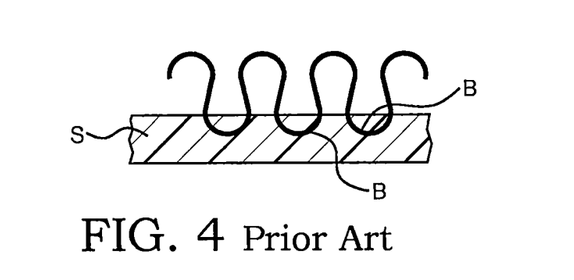
FIG. 4 is a diagrammatic representation of a second prior art foam backing system, this time with a single thread/strand having one end into a polymer base but no interweaving therethrough, per FIG. 7 of U.S. Pat. No. 3,934,064.
Figure 5:
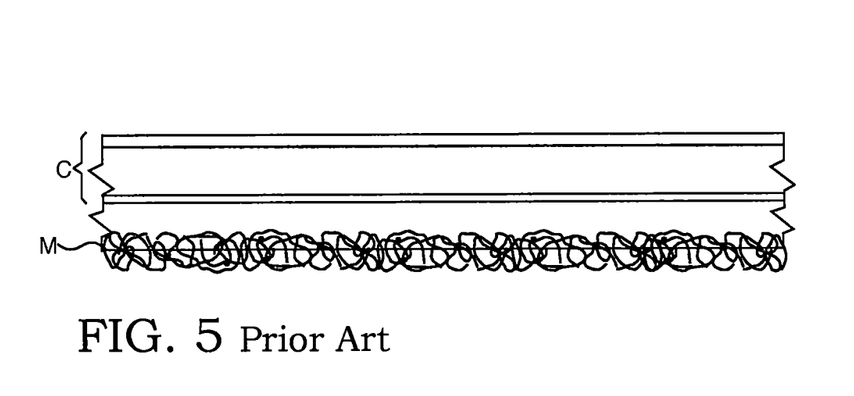
FIG. 5 is a cross-sectional diagram of a third prior art variety of material showing means for randomly embedding continuous strands of fabric into and at least partially below an innermost layer; but it exhibits no connection on randomness, per FIG. 8A of U.S. Published Application No. 20150246511.
Figure 6:
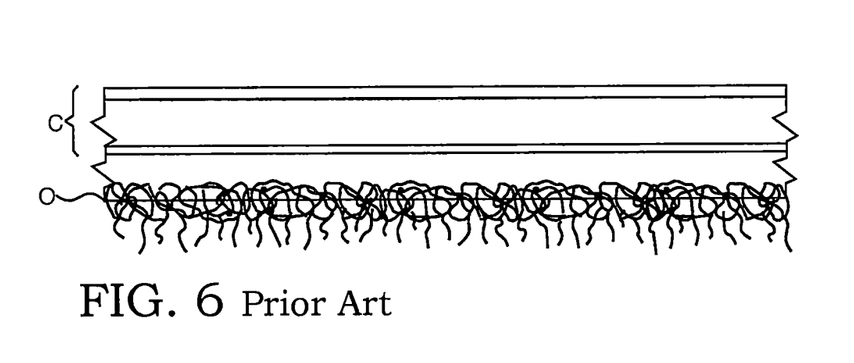
FIG. 6 is a cross-sectional diagram of a fourth prior art variety of material showing embedding strands of fabric with multiple downward extensions (in one common direction) from its innermost layer, per FIG. 8B of U.S. Published Application No. 20150246511.

FIGS. 3 through 6 show other relevant material modifications prior to the present invention. FIG. 3 shows looped layers L onto one another in a typical fabric material. FIG. 4 shows a prior art substrate S from which a single strand of line is embedded from only the adjoining base elements B. FIG. 5 shows a prior art scrim section with its non-woven mat M beneath composite sheet C, similar to the main disclosure of Applicant's U.S. Pat. No. 6,743,742. And FIG. 6 is a modified variation of FIG. 5 with an intentionally roughed up outer fibrous layer O which still does not achieve the bond adhesion levels observed with the present invention.

FIGS. 7 and 7A show one preferred embodiment of interior wall panel 10 made according to this invention. The exterior, metal wall to this panel is indicated with a TM designation and its innermost wall panel interior with a TI designation.

Said wall panel 10 has a base material 12, into which is sewn a special looped fabric backing, generally 14, consisting of an underlying substrate layer 16 from which a plurality of polymer loops 18 are interwoven and outwardly extend. The latter loops are encased in an outer foam layer 20 for subsequent lamination to form the wall panel proper. Such loops are necessary and critical for integration into the base for making an improved GRTP product hereby.

FIG. 7B shows an alternate embodiment of wall panel 110, with its own fabric backing 114, and corresponding substrate layer 116 from which three representative heights of variably sized loops, 118a, 118b and 118c are interwoven, and then combed or brushed upward to "stand at attention" prior to being foamed about.

Figure 8:
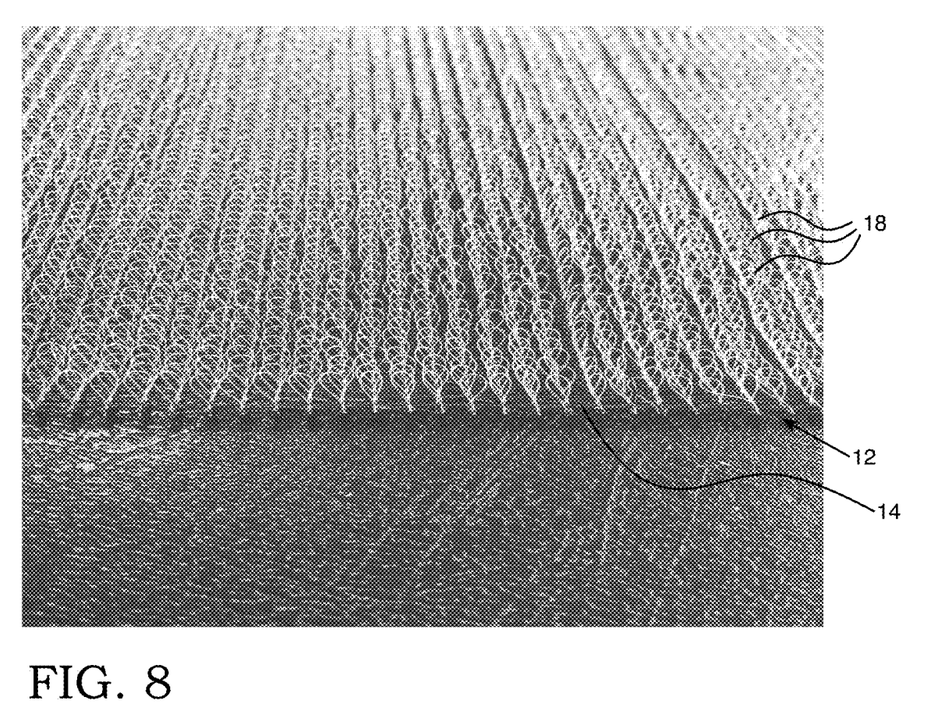
FIG. 8 is a top perspective photograph showing, from one edge, an embodiment of loop scrim fabric backing per this invention.

FIG. 8 is a photograph depicting a forward edge to a representative section of the base material from FIGS. 7 and 7A with its rows of interwoven fabric backing attached thereto and its plurality of consistently-sized loops 18 extending upwardly therefrom . . . all before encasement in the foam to make the improved interior wall panel of this invention.

Figure 9:
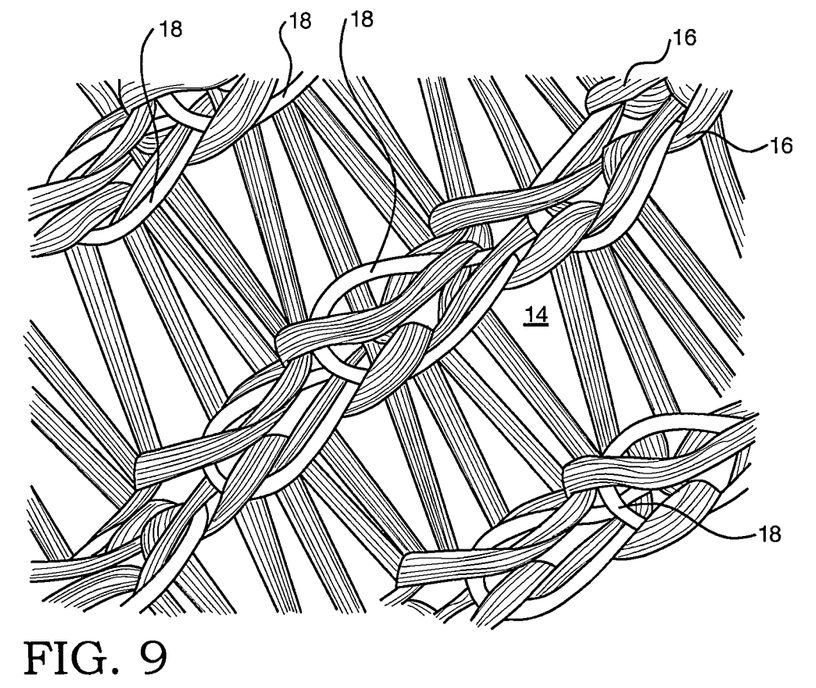
FIG. 9 is a close-up diagram showing or how the loops are interwoven into the base per one embodiment of this invention.

FIG. 9 shows an underside of substrate layer 16 (lined) from which the respective rows of loops 18 (unlined, for better illustration) are interwoven. Note how all of the loops tie into the base or weave of substrate layer 16. That base is necessary for embedding into the laminate product: the base sticks to the trailer backing interior TI while the loops of that product "stick" firmly into the foam injected between the interior TI and metal exterior TM.

Figure 10:
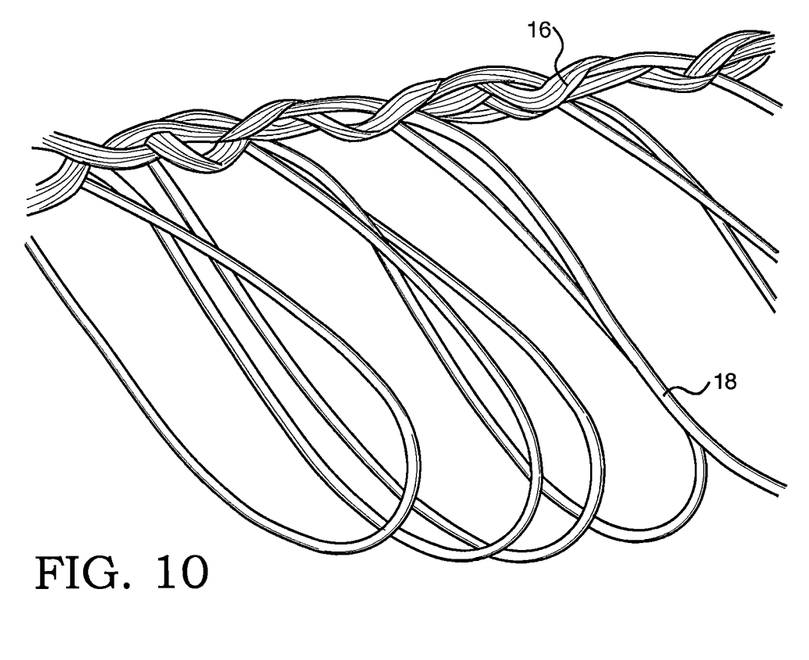
FIG. 10 is a close-up diagram focusing on one row of preferred loops with base material per this invention.

FIG. 10 shows a close up view of one representative row of loops 18 with a single braid of the substrate layer 16 wrapped thereabout consistently lined like the two components in preceding FIG. 9.

Figure 11:
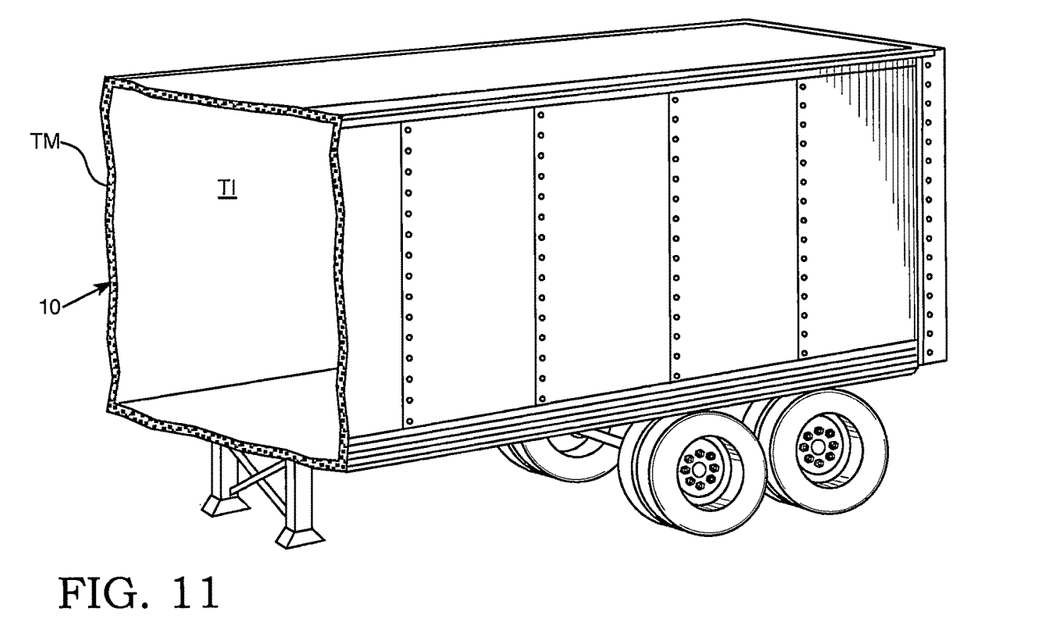
FIG. 11 is a perspective, sectional view of a refrigerated vehicle trailer showing the improved loop scrim fabric backing of this invention installed on the interior of same.

Finally, FIG. 11 is a representative trailer product with an exterior metal TM surface, showing in cutaway to expose one of its interior walls TI made using the panel improvements 10 of this invention.

Having described the currently preferred embodiments, it is to be understood that the scope of this invention may be further described by the scope of the appended claims.

What is claimed is:

1. A fabric for a glass-reinforced thermoplastic interior wall panel, said fabric adapted for connecting to a back side of a wall during manufacture of the glass-reinforced thermoplastic interior wall panel, said glass-reinforced thermoplastic interior wall panel adapted for use in a storage unit, said fabric comprising:
(a) a polymer woven wall substrate; and
(b) a plurality of fully looped sections adhered at each loop ends of the plurality of fully looped sections and secured into the polymer woven wall substrate, said plurality of fully looped sections adapted for extending in a first direction outwardly beyond the polymer woven wall substrate before a thermoplastic resin is injected onto the polymer woven wall substrate and the plurality of fully looped sections secured therein to form the glass-reinforced thermoplastic interior wall panel for use in the storage unit.

2. The fabric of claim 1 wherein, prior to injection with the thermoplastic resin, the plurality of fully looped sections extend in the first direction between about 3-6 mm outwardly beyond the polymer woven wall substrate.

3. The fabric of claim 2 wherein the plurality of fully looped sections extend in the first direction at a substantially consistent height outwardly beyond the polymer woven wall substrate.

4. The fabric of claim 1 wherein the plurality of fully looped sections consist essentially of a polyester blend.

5. The fabric of claim 1, which includes between about 40 to 75 loops from the plurality of fully looped sections per square inch of fabric.

6. The fabric of claim 1, which includes between about 100 to 140 loops from the plurality of fully looped sections per square inch of fabric.

7. The fabric of claim 1 wherein, prior to injection with the thermoplastic resin, the plurality of fully looped sections extend perpendicular to the polymer woven wall substrate.

* * * * *